United States Patent
Suzuki (10) Patent No.: US 8,289,415 B2
(45) Date of Patent: Oct. 16, 2012

(54) BLINK SIGNAL DETECTION CIRCUIT, BLINK SIGNAL DETECTION METHOD, OBJECT SENSING APPARATUS, OBJECT SENSING METHOD, AND IMAGING SYSTEM

(75) Inventor: Shuji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 241 days.

(21) Appl. No.: 12/918,850

(22) PCT Filed: Feb. 25, 2009

(86) PCT No.: PCT/JP2009/053367
§ 371 (c)(1),
(2), (4) Date: Aug. 23, 2010

(87) PCT Pub. No.: WO2009/107636
PCT Pub. Date: Sep. 3, 2009

(65) Prior Publication Data
US 2011/0001844 A1 Jan. 6, 2011

(30) Foreign Application Priority Data
Feb. 26, 2008 (JP) ................. 2008-044275

(51) Int. Cl.
*H04N 9/73* (2006.01)
(52) U.S. Cl. .................. 348/226.1
(58) Field of Classification Search ........... 348/226.1, 348/221.1, 370, 371, 362, 364, 366
See application file for complete search history.

(56) References Cited

U.S. PATENT DOCUMENTS

| 2003/0058262 A1 | 3/2003 | Sato et al. |
| 2006/0192664 A1 | 8/2006 | Kushida et al. |
| 2006/0250516 A1 * | 11/2006 | Nishiuchi ............. 348/370 |
| 2010/0110225 A1 * | 5/2010 | Wada et al. ......... 348/226.1 |
| 2010/0157085 A1 * | 6/2010 | Sasaki ................. 348/371 |

FOREIGN PATENT DOCUMENTS

| JP | 10-162152 A | 6/1998 |
| JP | 2001-022342 A | 1/2001 |
| JP | 2003-179556 A | 6/2003 |
| JP | 2004-226227 A | 8/2004 |
| JP | 2005-215779 A | 8/2005 |
| JP | 2006-235807 A | 9/2006 |

* cited by examiner

*Primary Examiner* — Aung S Moe
(74) *Attorney, Agent, or Firm* — Sughrue Mion, PLLC (57) ABSTRACT

There is provided a blink signal detection circuit which can clearly detect a blink signal of a blinking measurement target even if the measurement target moves. The blink signal detection circuit includes: a plurality of storage media that record image information shot by an imaging device at respective times, the image information showing a light-dark change in brightness of the measurement target which is blinking; an image information enlargement unit (pixel information enlargement circuit) that enlarges a plurality of pieces of image information at the respective different times with reference to a spatial axis, thereby generating a plurality of pieces of enlarged image information at the respective different times; and a correlation detection unit (correlation integration circuit) that performs correlation detection between the plurality of pieces of enlarged image information at the respective different times. The blink signal detection circuit detects the blink signal of the measurement target from a result of correlation detection obtained by the correlation detection unit.

13 Claims, 6 Drawing Sheets

FIG.3

100: IMAGING DEVICE
200: IMAGE SORTING CIRCUIT
301-304: FRAME MEMORY
400: PIXEL INFORMATION ENLARGEMENT CIRCUIT
500: CORRELATION INTEGRATION CIRCUIT

10: PROCESSING UNIT

51: LIGHT-DARK CHANGE PART
50: POSITION MEASUREMENT TARGET (DETECTION RESULT SIGNAL)

FIG.4

BLINK SIGNAL DETECTION CIRCUIT, BLINK SIGNAL DETECTION METHOD, OBJECT SENSING APPARATUS, OBJECT SENSING METHOD, AND IMAGING SYSTEM

TECHNICAL FIELD

The present invention relates to a blink signal detection circuit, a blink signal detection method, and an imaging system, and more particularly to a circuit that detects the presence of a target object based on a blink signal, and a circuit that detects a blink signal by using an imaging device.

BACKGROUND ART

To identify items stored in a warehouse or the like, there is a known method in which light-dark changes of blinking circuits attached to the items are detected by using an imaging device which is installed on the ceiling or the like, and an image signal processing circuit in the subsequent stage. An example of such a method is to detect the blinking of a light-emitting diode with an imaging device and a processing circuit in the subsequent stage (for example, see PTL 1).

CITATION LIST

Patent Literature
{PTL 1} JP-A-2003-179556

SUMMARY OF INVENTION

Technical Problem

The conventional blink signal detection circuit described above has had a problem in detecting blinking from a moving object. The reason is that while a fixed pattern of blinking is to be detected, the recording position of the blink information in a frame memory varies with the movement of the target object.

Figure 4:
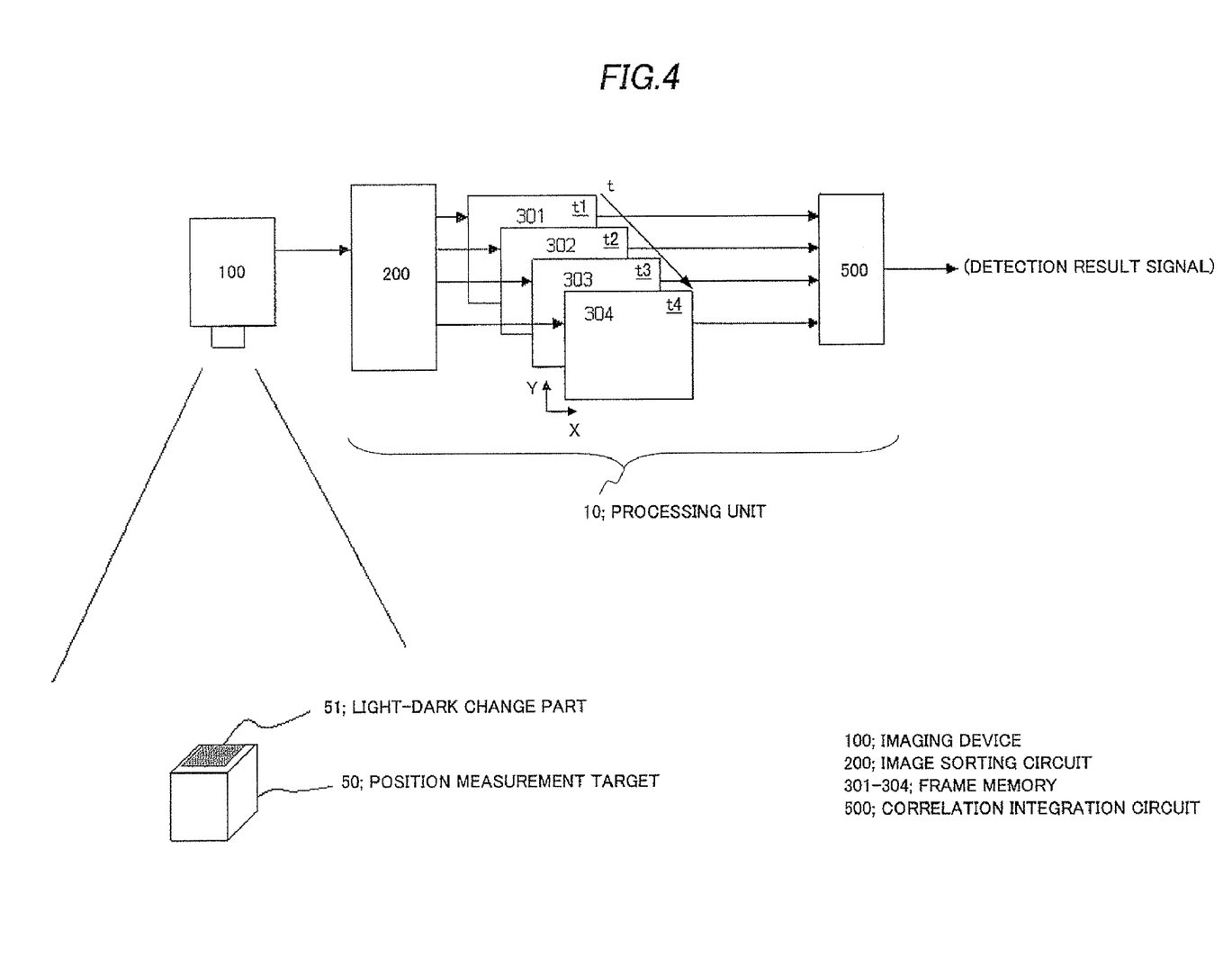
FIG. 4 A schematic block diagram showing the configuration of the blink signal detection circuit according to the related art.

FIG. 4 is a diagram showing the configuration of a blink signal detection circuit according to the related art. The blink signal detection circuit shown in the diagram includes an imaging device 100 which captures an image of a position measurement target 50, and a processing unit 10 which is connected subsequent to the imaging device 100. The processing unit 10 includes an image sorting circuit 200, a plurality of frame memories 301 to 304, and a correlation integration circuit 500.

In FIG. 4, the position measurement target 50 is provided with a light-dark change part 51 which is composed of a light-emitting unit such as a light-emitting diode. The blink signal of the light-dark change part 51 is shot by the imaging device 100. The output of the imaging device 100 is written into the plurality of frame memories 301 to 304 at respective times t (in the shown example, t=t1, t2, t3, and t4) by the image sorting circuit 200. The outputs of the respective frame memories 301 to 304 are input to the correlation integration circuit 500. The correlation integration circuit 500 detects the blinking of the light-dark change part 51 by correlation integration processing between the pixels in the same respective coordinates (xy coordinates: in the example of FIG. 2, x=1 to 8 and y=1 to 8) on the two-dimensional spatial axes (X-axis and Y-axis). Consequently, it is possible to identify the position of the position measurement target 50.

Here, the imaging device 100 shoots images corresponding to the state of brightness tones of the light-dark change part 51 at respective times t1, t2, t3, and t4. The frame memories 301, 302, 303, and 304 record density information corresponding to the tones of brightness at times t1, t2, t3, and t4, respectively, as data on the pixel value at each set of coordinates. The light-dark changes in the brightness of the light-dark change part 51 are defined in advance so as to be in a low state (dark state) at the first and last times t1 and t4 and a high state (light state) at the two intermediate times t2 and t3.

FIG. 5 is a diagram for explaining the operation of the related art shown in FIG. 4. FIGS. 5A, 5B, 5C, and 5D show information recorded in the frame memories 301, 302, 303, and 304 at times t1, t2, t3, and t4, respectively. FIG. 5E shows an example of the result of integration in the correlation integration circuit 500.

Figure 5A:
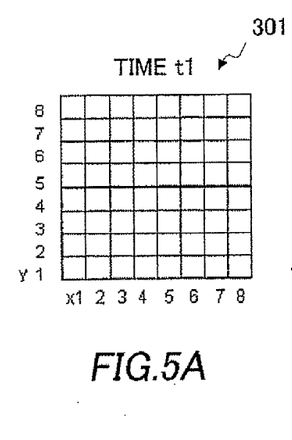
FIG. 5 A diagram for explaining the operation of the related art.
Figure 5B:
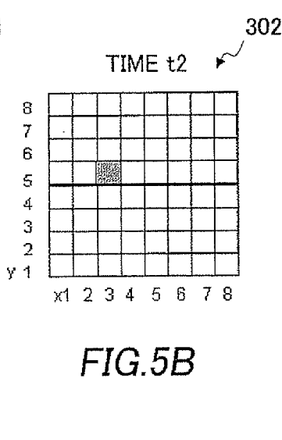
Figure 5C:
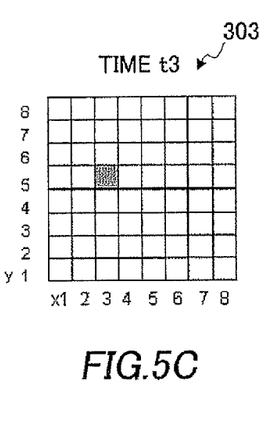

At times t2 and t3 shown in FIGS. 5B and 5C, the light-dark change portion 51 of FIG. 4 is in a high state in terms of the brightness tone. Density information corresponding to the high state is thus recorded in the portion at the coordinates x=3, y=5 where the light-dark change part 51 is shot.

Figure 5D:
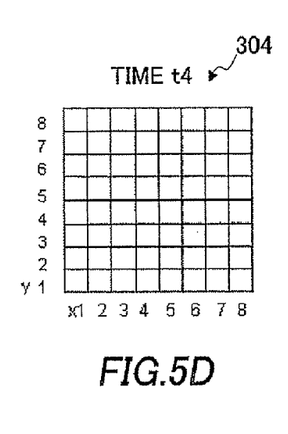

On the other hand, at times t1 and t4 shown in FIGS. 5A and 5D, the light-dark change portion 51 of FIG. 4 is in a low state in terms of the brightness tone. Density information corresponding to the low state is thus recorded in the portion at the coordinates x=3, y=5 on the two-dimensional spatial axes where the light-dark change part 51 is shot. In such a case, the density of the target pixel in the low state is the same as that of the peripheral pixels. The density information corresponding to the low state is thus shown all over regardless of the coordinates.

The correlation integration circuit 500 shown in FIG. 4 performs correlation integration between the pieces of information in the frame memories 301 to 304 at times t1, t2, t3, and t4 with respect to each set of coordinates. In the correlation integration processing, an addition is performed if in a high state, and a subtraction if in a low state, at each time of tones to be detected. More specifically, at the two intermediate times t2 and t3, the pixel values are added due to the high state. At the first and last intermediate times t1 and t4, the pixel values are subtracted due to the low state.

Figure 5E:
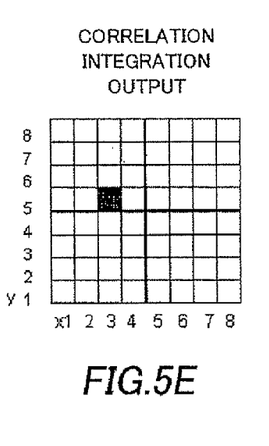

Consequently, as shown in FIG. 5E, a clearly high state appears in the portion at the coordinates x=3, y=5 since the pieces of density information corresponding to the high state in the frame memories 302 and 303 at the two intermediate times t2 and t3 are added. This clearly shows the presence of a blinking object, which is the position measurement target 50 to be detected, at the position corresponding to the coordinates x=3, y=5. Here, the detection becomes difficult if the blinking object moves. An example will be shown in FIG. 6.

As with FIG. 5, FIGS. 6A, 6B, 6C, and 6D show information recorded in the frame memories 301, 302, 303, and 304 at times t1, t2, t3, and t4, respectively. FIG. 6E shows an example of the result of integration in the correlation integration circuit 500.

Figure 6A:
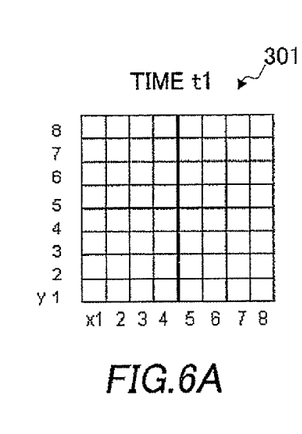
FIG. 6 A diagram for explaining the problem of the related art.
Figure 6B:
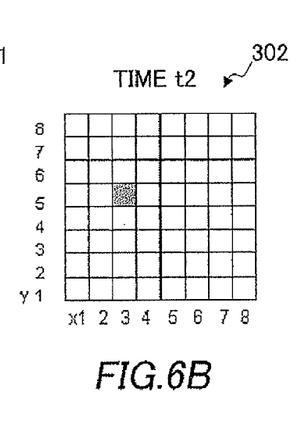
Figure 6C:
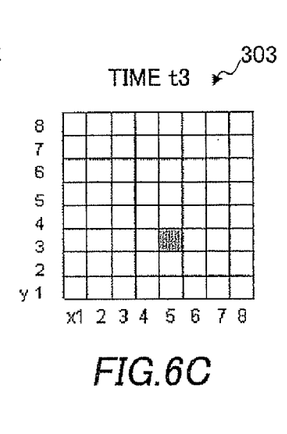
Figure 6D:
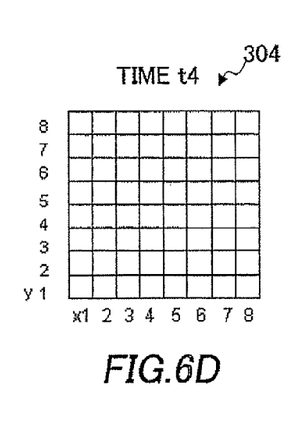
Figure 6E:
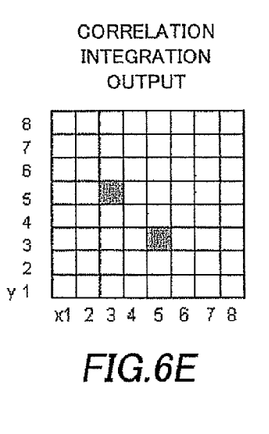

At an intermediate time t2, as shown in FIG. 6B, information corresponding to the high-state density is recorded in the portion at the coordinates x=3, y=5. At the next time t3, as shown in FIG. 6C, the blinking object (position measurement target 50) moves to the portion at the coordinates x=5, y=3. Consequently, as shown in FIG. 6E, the result of integration in the correlation integration circuit 500 is such that the pieces of density information corresponding to the high state appear separately at the coordinates x=3, y=5 and x=5, y=3 without being added. Here, the density information corresponding to the high state is not clear as compared to FIG. 5E seen above. It is therefore not possible to clearly detect the blinking, which makes it difficult to identify the position of the blinking object.

An object of the present invention is to provide a blink signal detection circuit which can clearly detect a blink signal of a blinking measurement target even if the measurement target moves.

Solution to Problem

To achieve the foregoing object, a blink signal detection circuit according to the present invention includes: a plurality of storage media that record image information shot by an imaging device at respective times, the image information showing a light-dark change in brightness of the measurement target which is blinking; an image information enlargement unit that enlarges a plurality of pieces of image information at the respective different times with reference to a spatial axis, thereby generating a plurality of pieces of enlarged image information at the respective different times; and a correlation detection unit that performs correlation detection between the plurality of pieces of enlarged image information at the respective different times, the circuit detecting a blink signal of the measurement target from a result of correlation detection obtained by the correlation detection unit.

A blink signal detection method according to the present invention includes: recording image information shot by an imaging device into a plurality of storage media at respective times, the image information showing a light-dark change in brightness of a measurement target which is blinking; an image information enlargement unit enlarging a plurality of pieces of image information at the respective different times with reference to a spatial axis, thereby generating a plurality of pieces of enlarged image information at the respective different times; a correlation detection unit performing correlation detection between the plurality of pieces of enlarged image information at the respective different times; and detecting a blink signal of the measurement target from a result of correlation detection obtained by the correlation detection unit.

An object sensing apparatus according to the present invention includes the blink signal detection circuit described above, and senses presence of the measurement target based on a result of detection of the blink signal.

An object sensing method according to the present invention uses the blink signal detection method described above to sense presence of the measurement target based on a result of detection of the blink signal.

An imaging system according to the present invention includes an imaging device and a processing unit arranged subsequent to the imaging device, the processing unit including the blink signal detection circuit described above.

Advantageous Effects of Invention

According to the present invention, information that shows light-dark changes in the brightness of the blinking measurement target is two-dimensionally enlarged in area with reference to the spatial axes in a prior stage of the correlation detection processing so that the areas of correlation integration will overlap despite the movement of the measurement target. It is therefore possible to clearly detect the blink signal of the blinking measurement target even when the measurement target moves.

REFERENCE SIGNS LIST

10: processing unit (processing circuit)
100: imaging device
200: image sorting circuit
301 to 304: frame memory (storage medium)
400: pixel information enlargement circuit (image information enlargement unit)
500: correlation integration circuit (correlation detection unit)

DESCRIPTION OF EMBODIMENTS

Now, exemplary embodiments of the present invention will be described in detail with reference to the drawings. While each of the following examples will deal with a blink signal detection circuit, the present invention is not limited thereto and may be applied to a corresponding blink detection method, object sensing apparatus, object sensing method, and imaging system.

Example 1

Figure 1:
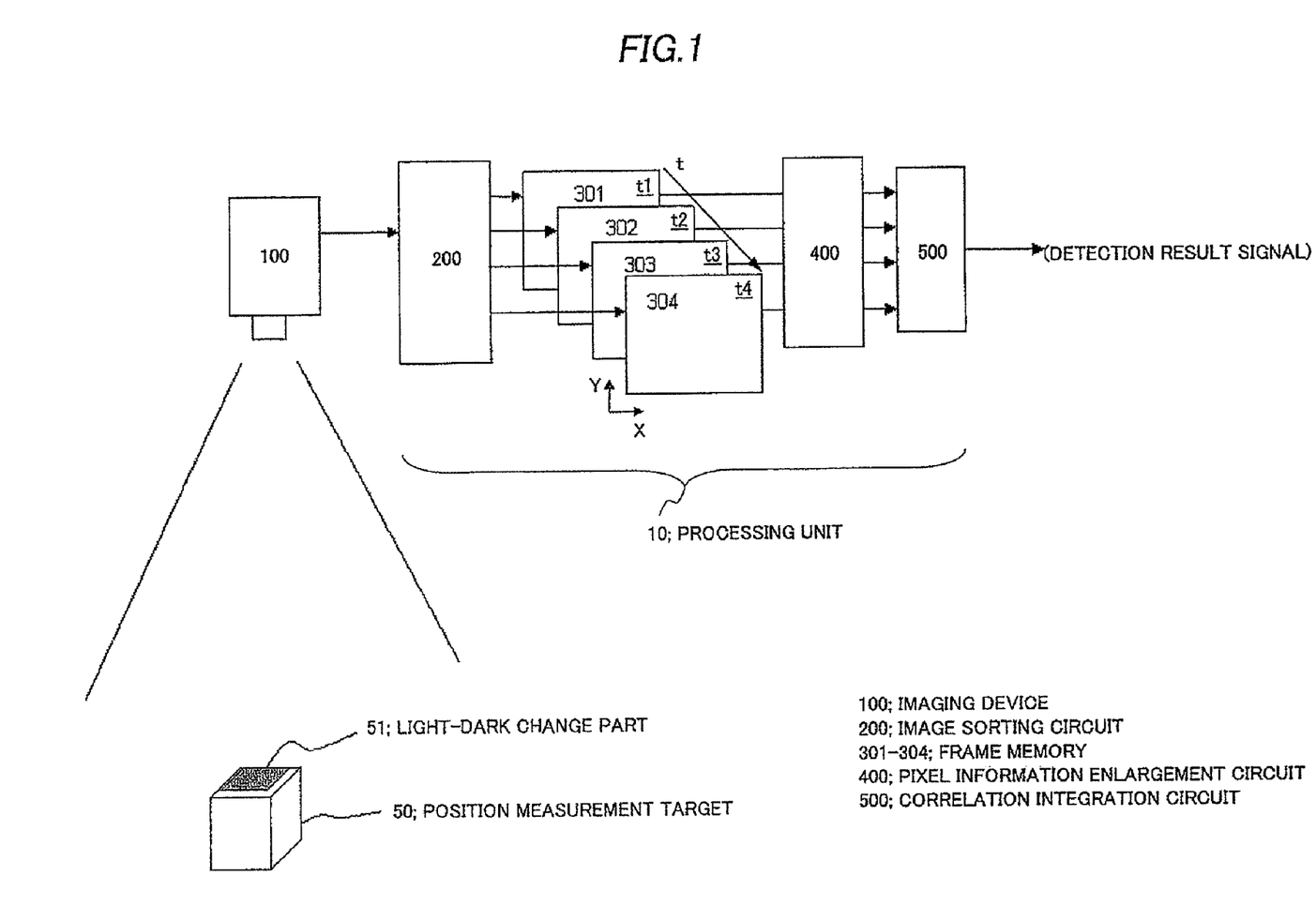
FIG. 1 A schematic block diagram showing the configuration of a blink signal detection circuit according to a first example of the present invention.

FIG. 1 is a diagram showing a first example of the present invention. The blink signal detection circuit shown in the diagram includes an imaging device 100 that shoots (captures an image of) a position measurement target 50 which is blinking, and a processing unit (processing circuit) 10 that is connected subsequent to the imaging device 100. The processing unit 10 includes an image sorting circuit 200, a plurality of frame memories (storage media) 301 to 304, a pixel information enlargement circuit (image information enlargement unit) 400, and a correlation integration circuit (correlation detection unit) 500.

The imaging device 100 is a solid-state image sensing device, such as a CCD (Charge Coupled Device) image sensor which uses CCDs to select and read a two-dimensional array of pixels, and a CMOS (Complementary Metal Oxide Semiconductor) image sensor which uses an X-Y selection matrix.

The plurality of frame memories 301 to 304 record image information shot by the imaging device 100 at respective times, the image data showing light-dark changes in the brightness of the position measurement target 50 which is blinking.

The correlation integration circuit 500 performs correlation detection between the plurality of pieces of image information at respective different times, recorded in the plurality of frame memories 301 to 304.

The pixel information enlargement circuit 400 is arranged between the imaging device 100 and the correlation integration circuit 500. The pixel information enlargement circuit 400 enlarges a plurality of pieces of image information at respective different times with reference to spatial axes, thereby generating a plurality of pieces of enlarged image information at respective different times.

In the present example, the pixel information enlargement circuit 400 is arranged between the plurality of frame memories 301 to 304 and the correlation integration circuit 500. The pixel information enlargement circuit 400 enlarges the plurality of pieces of image information at respective different times that are recorded in the plurality of frame memories 301 to 304 with reference to two-dimensional spatial axes (X-axis and Y-axis), thereby generating a plurality of pieces of enlarged image information at respective different times. In such a case, the pixel information enlargement circuit 400 generates the enlarged image information by performing information conversion on information on peripheral pixels based on information on a target pixel, the peripheral pixels lying in a peripheral area of the target pixel among the pixels constituting the image information, the target pixel showing information when the light-dark change in the brightness of the position measurement target 50 is in a light state. The information conversion is performed, for example, so that the peripheral pixels lying in the peripheral area of the target pixel have the same information as that on the target pixel. Here, the peripheral area of a target pixel is set in advance so that the areas of correlation integration in pieces of enlarged image information at adjoining times overlap each other even when the position measurement target 50 moves. In the present example, an area that is specified by eight sets of coordinates on the left, right, top, and bottom around the coordinates of a target pixel is set as the peripheral area of the target pixel.

The correlation integration circuit 500 performs correlation detection between the plurality of pieces of enlarged image information at respective different times. In the present example, the correlation integration circuit 500 performs correlation detection between the plurality of pieces of enlarged image information at respective different times which are generated by the pixel information enlargement circuit 400.

With the above-described configuration, the blink signal detection circuit shown in FIG. 1 detects a blink signal of the position measurement target 50 from the result of correlation detection obtained by the correlation integration circuit 500, and outputs the blink signal as a detection result signal. This makes it possible to identify the position of the position measurement target 50.

In FIG. 1, the position measurement target 50 to blink is provided with a light-dark change part 51 which is composed of a light-emitting unit such as a light-emitting diode. The light-dark change part 51 is shot by the imaging device 100 as density information corresponding to a state of tone that indicates the light-dark change in the brightness of the position measurement target 50 which is blinking. The output of the imaging device 100 is written into the plurality of frame memories 301 to 304 at respective times t (in the shown example, time t=t1, t2, t3, and t4) by the image sorting circuit 200. The outputs of the respective frame memories 301 to 304 are input to the correlation integration circuit 500 through the pixel information enlargement circuit 400. The blinking of the light-dark change part 51 is detected by correlation integration processing between the pixels in the same respective coordinates on the two-dimensional spatial axes (X-axis and Y-axis). Consequently, it is possible to identify the position of the position measurement target 50.

Here, the imaging device 100 shoots images corresponding to the tones of brightness of the light-dark change part 51 at respective times t1, t2, t3, and t4. The frame memories 301, 302, 303, and 304 record the image information corresponding to the tones of brightness at times t1, t2, t3, and t4, respectively, as data on the pixel value at each set of coordinates on the spatial axes (X-axis and Y-axis).

Next, the operation of the present example will be described with reference to FIG. 2.

Figure 2A:
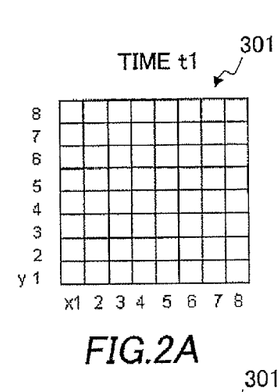
FIG. 2 A diagram for explaining the operation of the blink signal detection circuit according to the first example of the present invention.

FIGS. 2A, 2B, 2C, and 2D show information recorded in the frame memories 301, 302, 303, and 304 at times t1, t2, t3, and t4, respectively. FIGS. 2E, 2F, 2G, and 2H show information resulting from the processing of the pixel information enlargement circuit 400 on the recorded information in the frame memories 301, 302, 303, and 304 at times t1, t2, t3, and t4, respectively. FIG. 2I shows an example of the result of integration in the correlation integration circuit 500.

Here, the imaging device 100 shown in FIG. 1 shoots images corresponding to the tones of brightness of the light-dark change part 51 at respective times t1, t2, t3, and t4. The frame memories 301, 302, 303, and 304 record the information corresponding to the density of the brightness tone at times t1, t2, t3, and t4, respectively, as data on the pixel value at each set of two-dimensional coordinates (xy coordinates: in the example of FIG. 2, x=1 to 8 and y=1 to 8). The light-dark changes in the brightness of the light-dark change part 51 are defined in advance so as to be in a low state (dark state) at the first and last times t1 and t4 and a high state (light state) at the two intermediate times t2 and t3.

Figure 2B:
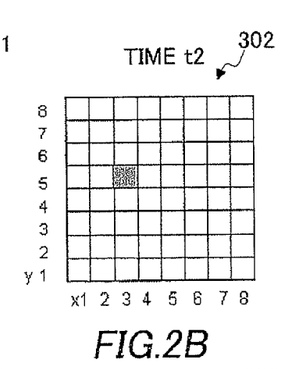
Figure 2C:
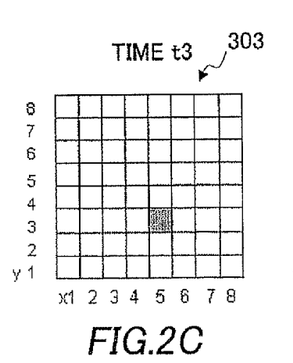

At the two intermediate times t2 and t3, as shown in FIGS. 2B and 2C, respectively, the light-dark change part 51 of the position measurement target 50 is in a high state in terms of the brightness tone, and the position measurement target 50 is moving. Density information corresponding to the high state is thus recorded in both the portions (target pixels) at the coordinates x=3, y=5 and the coordinates x=5, y=3 that correspond to the positions of the light-dark change part 51 of the position measurement target 50 shot at times t2 and t3, respectively.

Figure 2D:
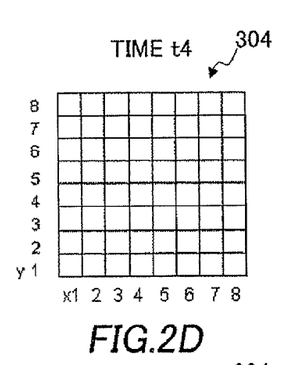
Figure 2E:
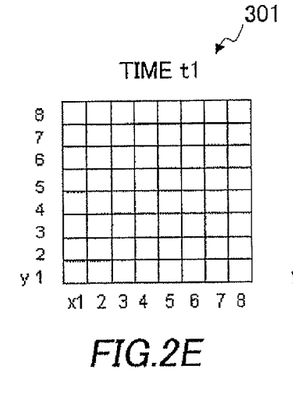

At times t1 and t4, as shown in FIGS. 2A and 2D, respectively, the light-dark change part 51 of the position measurement target 50 is in a low state in terms of the brightness tone. Density information corresponding to the low state is thus recorded in the portion at the coordinates x=3, y=5 which is the shot position of the light-dark change part 51. Since the density of the target pixel in the low state is the same as that of the peripheral pixels, the density information corresponding to the low state is shown all over regardless of the coordinates.

The pixel information enlargement circuit 400 reads the tone information at each set of coordinates that constitute the image information in the frame memories 301 to 304. If the tone information on a target pixel at certain coordinates corresponds to a high state, the pixel information enlargement circuit 400 performs information conversion on the pixel value data so that all the portions (peripheral pixels) at eight sets of coordinates on the left, right, top, and bottom in the peripheral area around the portion at the coordinates (target pixel) have the density information corresponding to the high state. The pixel information enlargement circuit 400 thereby enlarges the area of information to generate a plurality of pieces of enlarged image information at respective different times.

Figure 2F:
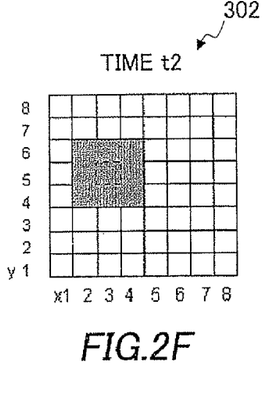

Suppose, as shown in FIG. 2B, that the density information on the portion at the coordinates x=3, y=5 corresponds to a high state. As shown in FIG. 2F, the corresponding output of the pixel information enlargement circuit 400 is such that the density information on the portions at a total of nine sets of coordinates including the portions (peripheral pixels) at the eight sets of coordinates on the left, right, top, and bottom in the peripheral area around the portion (target pixel) at the coordinates x=3, y=5 ((x,y)=(2,4), (2,5), (2,6), (3,4), (3,6), (4,4), (4,5), and (4,6)) is also converted into that corresponding to the high state.

Figure 2G:
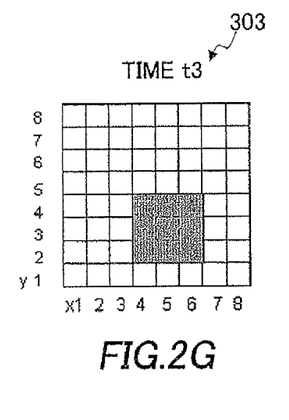
Figure 2H:
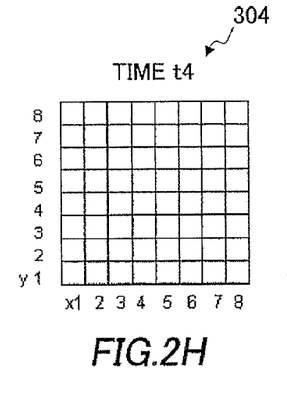
Figure 2I:
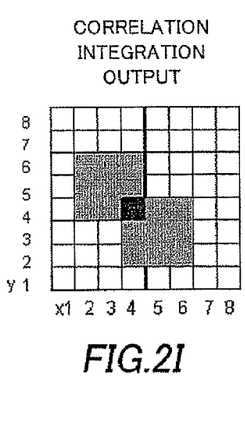

Suppose, as shown in FIG. 2C, that the density information on the pixel at the coordinates x=5, y=3 corresponds to a high state. As shown in FIG. 2G, the corresponding output of the pixel information enlargement circuit 400 is such that the density information on the portions at a total of nine sets of coordinates including the portions (peripheral pixels) at the eight sets of coordinates on the left, right, top, and bottom in the peripheral area around the portion (target pixel) at the coordinates x=5, y=3 ((x,y)=(4,2), (4,3), (4,4), (5,2), (5,4), (6,2), (6,3), and (6,4)) is also converted into that corresponding to the high state.

The signals shown in FIGS. 2E, 2F, 2G, and 2H are input to the correlation integration circuit 500. The result of correlation integration by the correlation integration circuit 500 between the plurality of pieces of enlarged image information at respective different times therefore shows density information that clearly corresponds to a high state in the portion at the coordinates x=4, y=4 as shown in FIG. 2I. This clearly shows the presence of the position measurement target 50 despite its movement, and it is possible to detect the blink signal of the position measurement target 50.

As described above, according to the present example, there is provided the pixel information enlargement circuit 400 which enlarges the information recorded in the frame memories 301 to 304 on the spatial axes, and the correlation detection is performed on the enlarged information. Since the information from the frame memories 301 to 304 is enlarged on the spatial axes, the areas of correlation integration at adjoining times overlap each other to provide a result of detection of high correlation even if the position measurement target 50 which is blinking is moving.

That is, according to the present example, the tone (light-dark) information which shows light-dark changes in the brightness of the blinking is two-dimensionally enlarged in area in a prior stage of the correlation integration processing so that the areas of correlation integration at adjoining times will overlap even despite the movement of the position measurement target 50. Such a configuration makes it possible to detect the blink signal with stability even if the position measurement target 50 which is blinking is moving. It is therefore possible to reliably sense and identify the position measurement target 50 which is blinking.

In the present example, the information enlargement is performed not by referring to data on a pixel and data on surrounding eight pixels and converting them into multi-pixel data different from that on the single pixel, but by referring to data on a single pixel alone and converting it into multi-pixel data identical to that on the single pixel. It is therefore possible to reliably detect the light and dark pattern of the position measurement target that is moving.

Example 2

Next, a second example of the present invention will be described with reference to FIG. 3.

The blink signal detection circuit shown in the diagram includes an imaging device 100 which captures an image of a position measurement target 50, and a processing unit 10 which is connected subsequent to the imaging device 100. The processing unit 10 includes an image sorting circuit 200, a plurality of frame memories 301 to 304, a pixel information enlargement circuit 400, and a correlation integration circuit 500.

Figure 3:
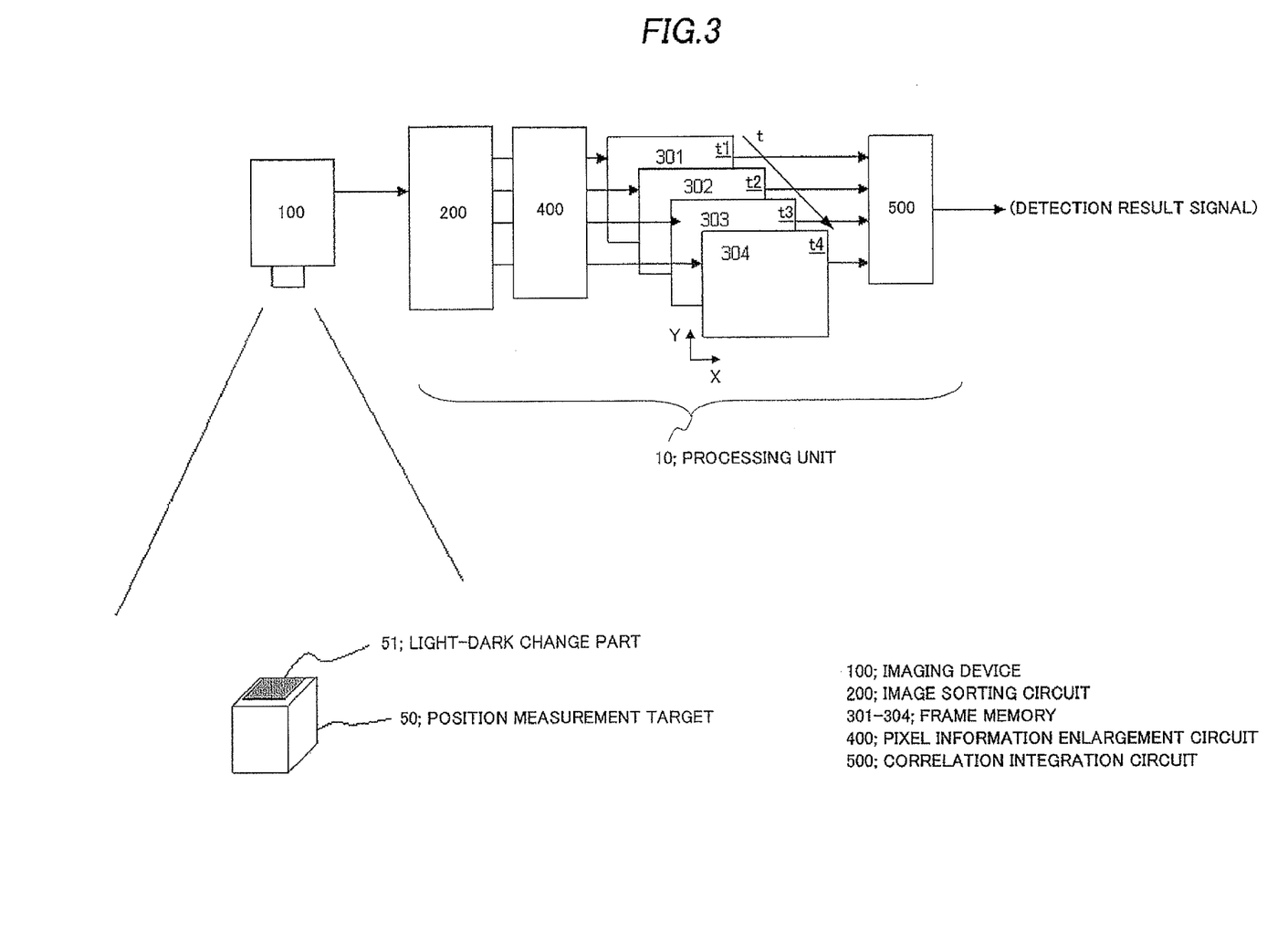
FIG. 3 A schematic block diagram showing the configuration of the blink signal detection circuit according to a second example of the present invention.

In FIG. 3, a difference from the first example shown in FIG. 1 lies in that the pixel information enlargement circuit 400 is arranged between the image sorting circuit 200 and the plurality of frame memories 301 to 304 so that the plurality of frame memories 301 to 304 and the pixel information enlargement circuit 400 are in an inverted order.

In such a case, the pixel information enlargement circuit 400 enlarges the image information from the imaging device 100 through the pixel sorting circuit 200 with reference to spatial axes (X-axis and Y-axis) at times t1, t2, t3, and t4, thereby generating pieces of enlarged image information at respective different times.

The plurality of frame memories 301 to 304 record the pieces of enlarged pixel information at respective times t1, t2, t3, and t4 which are generated by the pixel information enlargement circuit 400.

The correlation integration circuit 500 performs correlation integration between the pieces of enlarged image information at respective times t1, t2, t3, and t4 that are recorded in the plurality of frame memories 301 to 304. The correlation integration processing is the same as in the first example.

According to the present example, as in the first example, it is therefore possible to reliably detect the blink signal even if the position measurement target 50 which is blinking is moving. Consequently, it is possible to reliably sense the presence of the position measurement target 50 which is blinking.

Up to this point, the examples of the present invention have been described in detail. The present invention, however, is not limited to the foregoing examples which have been representatively illustrated. Based on the description of the claims, changes and modifications may be made to various aspects without departing from the gist of the present invention. Such changes and modifications are also intended to be embraced in the scope of the present invention.

For example, the foregoing examples have dealt with the cases where eight sets of coordinates around the coordinates of the target pixel are used as those of the peripheral area to be subjected to the information conversion. However, the present invention is not limited thereto. For example, the coordinates of any peripheral area may be set as long as the positions of adjoining pieces of enlarged image information at adjoining times can be configured to overlap each other. For example, the eight sets of surrounding coordinates may be increased or decreased. In such a case, the positions of the coordinates to be increased or decreased may be set as appropriate depending on the condition of movement of the position measurement target 50 if the condition of movement, such as the speed of movement and the direction of movement, can be predicted (assumed) in advance from the properties of the object, the moving path, and other constraints.

The foregoing examples have also dealt with the cases where four frame memories are used as the plurality of storage media. However, the present invention is not necessarily limited thereto. For example, more than four frame memories may be used.

The foregoing examples have dealt with the cases where the brightness of the light-dark change part 51 which is blinking on the position measurement target 50 is set to a fixed pattern of light-dark changes (tones) corresponding to the four times t1 to t4, i.e., a dark state (low state) at the first and last times t1 and t4 and a light state (high state) at the two intermediate times t2 and t3. The present invention is not limited thereto, however, and may be applied to any fixed pattern of light-dark changes as long as the blink signal of the position measurement target 50 can be detected with such a configuration.

In the foregoing examples, the correlation integration processing between images is performed with reference to the two-dimensional spatial axes (X-axis and Y-axis). However, the processing may be performed with reference to three-dimensional spatial axes (X-axis, Y-axis, and Z-axis) if applicable to a processing circuit for processing three-dimensional images.

The processing circuit unit 10 (the image sorting circuit 200, pixel information enlargement circuit 400, and correlation integration circuit 500) used in the blink signal detection circuit according to each of the foregoing examples is not limited to any particular physical configuration, internal hardware (circuit), or software (program) configuration as long as the above-described processing (functions) can be implemented. For example, separate circuits, units, or programs (program modules) may be configured independently. The circuitry may be integrally configured in a single circuit or unit, and may be applied in any other mode. Such modes may be selected as appropriate depending on the circumstances including the function and application of the apparatus to be practiced. A blink detection method having processing steps for performing the same processing corresponding to the respective functions of the foregoing components shall also be embraced in the scope of the present invention.

The processing of the foregoing components or at least part of the processing may be implemented by software processing of a computer such as a processor having a CPU (Central Processing Unit). In such a case, the program for operating the computer shall be embraced in the scope of the present invention. The program is not limited to one that is directly executable by the CPU, and may include various forms of programs such as a program in source form, a compressed program, and an encrypted program. The program may be applied in any modes, including an application program that operates in cooperation with a control program such as an OS (Operating System) and firmware in charge of control of the entire apparatus, an application program that is incorporated in part of the control program for integral operation, and software parts (software modules) that constitute such an application program. Moreover, if the program is to be implemented and used on an apparatus that has communication capabilities to communicate with an external device through a wireless or wired line, the program may be downloaded from a server apparatus or other external node on the communication line and installed in a recording medium of the own apparatus for use. Such modes may be selected as appropriate depending on the circumstances including the function and application of the apparatus to be practiced.

A computer-readable recording medium containing the foregoing computer program shall also be embraced in the scope of the present invention. In such a case, any mode of recording medium may used, including memories such as ROM (Read Only Memory), ones fixed in an apparatus for use, and portable types that can be carried by the user.

While the invention has been particularly shown and described with reference to examples thereof, the invention is not limited to these examples. It will be understood by those of ordinary skill in the art that various changes in form and details may be made therein without departing from the sprit and scope of the present invention as defined by the claims.

This application is based upon and claims the benefit of priority from Japanese patent application No. 2008-0044275, filed on 26 Feb. 2008, the disclosure of which is incorporated herein in its entirety by reference.

INDUSTRIAL APPLICABILITY

As has been described above, the present invention may be applied to a blink signal detection circuit, a blink signal detection method, an object sensing apparatus, an object sensing method, an imaging system, and so on. In particular, the present invention may be applied to a circuit that detects the presence of a target object based on a blink signal, a circuit that detects a blink signal by using an imaging device, etc.

The invention claimed is:

1. A blink signal detection circuit comprising:
   a plurality of storage media that record image information shot by an imaging device at respective times, the image information showing a light-dark change in brightness of a measurement target which is blinking;
   an image information enlargement unit that enlarges a plurality of pieces of image information at the respective different times with reference to a spatial axis, thereby generating a plurality of pieces of enlarged image information at the respective different times; and
   a correlation detection unit that performs correlation detection between the plurality of pieces of enlarged image information at the respective different times,
   wherein:
   the circuit detects a blink signal of the measurement target from a result of correlation detection obtained by the correlation detection unit; and
   the image information enlargement unit generates the enlarged image information by performing information conversion on information on peripheral pixels based on information on a target pixel, the peripheral pixels lying in a peripheral area of the target pixel among pixels constituting the image information, the target pixel showing tone information when the light-dark change in the brightness of the measurement target is in a light state.

2. The blink signal detection circuit according to claim 1, wherein:
   the image information enlargement unit is arranged between the plurality of storage media and the correlation detection unit, and enlarges the plurality of pieces of image information at the respective different times recorded in the plurality of storage media with reference to the spatial axis, thereby generating a plurality of pieces of enlarged image information at the respective different times; and
   the correlation detection unit performs the correlation detection between the plurality of pieces of enlarged image information at the respective different times generated by the image information enlargement unit.

3. The blink signal detection circuit according to claim 1, wherein:
   the image information enlargement unit is arranged between the imaging device and the plurality of storage media, and enlarges image information from the imaging device at respective times with reference to the spatial axis, thereby generating a plurality of pieces of enlarged image information at the respective different times;
   the plurality of storage media record the plurality of pieces of enlarged image information at the respective different times generated by the image information enlargement unit; and
   the correlation detection unit performs the correlation detection between the plurality of pieces of enlarged image information at the respective different times recorded in the plurality of storage media.

4. The blink signal detection circuit according to claim 1, wherein the image information enlargement unit generates the enlarged image information by performing the information conversion so that the peripheral pixels lying in the peripheral area of the target pixel among the pixels constituting the image information have the same information as that on the target pixel, the target pixel showing the tone information when the light-dark change in the brightness of the measurement target is in the light state.

5. The blink signal detection circuit according to claim 1, wherein the peripheral area of the target pixel is set in advance so that areas of correlation detection in pieces of enlarged image information at adjoining times overlap each other when the measurement target moves.

6. An object sensing apparatus comprising
the blink signal detection circuit according to claim 1
wherein the apparatus senses presence of the measurement target based on a result of detection of the blink signal.

7. An imaging system comprising:
an imaging device; and
a processing unit arranged subsequent to the imaging device,
wherein the processing unit includes the blink signal detection circuit according to claim 1.

8. A blink signal detection method comprising:
recording image information shot by an imaging device into a plurality of storage media at respective times, the image information showing a light-dark change in brightness of a measurement target which is blinking;
an image information enlargement unit enlarging a plurality of pieces of image information at the respective different times with reference to a spatial axis, thereby generating a plurality of pieces of enlarged image information at the respective different times;
a correlation detection unit performing correlation detection between the plurality of pieces of enlarged image information at the respective different times;
detecting a blink signal of the measurement target from a result of correlation detection obtained by the correlation detection unit; and
the image information enlargement unit generating the enlarged image information by performing information conversion on information on peripheral pixels based on information on a target pixel, the peripheral pixels lying in a peripheral area of the target pixel among pixels constituting the image information, the target pixel showing tone information when the light-dark change in the brightness of the measurement target is in a light state.

9. The blink signal detection method according to claim 8, wherein:
the image information enlargement unit enlarges, between the plurality of storage media and the correlation detection unit, the plurality of pieces of image information at the respective different times recorded in the plurality of storage media with reference to the spatial axis, thereby generating a plurality of pieces of enlarged image information at the respective different times; and
the correlation detection unit performs the correlation detection between the plurality of pieces of enlarged image information at the respective different times generated by the image information enlargement unit.

10. The blink signal detection method according to claim 8, wherein:
the image information enlargement unit enlarges, between the imaging device and the plurality of storage media, image information from the imaging device at respective times with reference to the spatial axis, thereby generating a plurality of pieces of enlarged image information at the respective different times;
recording the plurality of pieces of enlarged image information at the respective different times generated by the image information enlargement unit into the plurality of storage media; and
the correlation detection unit performs the correlation detection between the plurality of pieces of enlarged image information at the respective different times recorded in the plurality of storage media.

11. The blink signal detection method according to claim 8, wherein the image information enlargement unit generates the enlarged image information by performing the information conversion so that the peripheral pixels lying in the peripheral area of the target pixel among the pixels constituting the image information have the same information as that on the target pixel, the target pixel showing the tone information when the light-dark change in the brightness of the measurement target is in the light state.

12. The blink signal detection method according to claim 8, wherein the peripheral area of the target pixel is set in advance so that areas of correlation detection in pieces of enlarged image information at adjoining times overlap each other when the measurement target moves.

13. An object sensing method using the blink signal detection method according to claim 8 to sense presence of the measurement target based on a result of detection of the blink signal.

* * * * *